(12) United States Patent
Cantrell

(10) Patent No.: US 8,424,797 B1
(45) Date of Patent: Apr. 23, 2013

(54) AIR-GROUND VEHICLE

(76) Inventor: Joseph Cantrell, Blue Ridge, GA (US)

(*) Notice: Subject to any disclaimer, the term of this patent is extended or adjusted under 35 U.S.C. 154(b) by 292 days.

(21) Appl. No.: 12/910,971

(22) Filed: Oct. 25, 2010

(51) Int. Cl.
*B64C 37/02* (2006.01)
*B64D 5/00* (2006.01)

(52) U.S. Cl.
USPC .............................................. 244/2

(58) Field of Classification Search ............ 244/2, 12.1, 244/15, 36, 57, 198, 50
See application file for complete search history.

(56) References Cited

U.S. PATENT DOCUMENTS

| | | | |
|---|---|---|---|
| 1,918,536 A | | 7/1933 | Griswold |
| 2,168,166 A | * | 8/1939 | Larrecq ............................ 244/57 |
| 2,369,859 A | | 2/1945 | Sargeant |
| 2,372,250 A | * | 3/1945 | Burnelli ........................... 244/15 |
| 2,387,526 A | | 10/1945 | Nagamatsu |
| D146,847 S | | 6/1947 | Braeman |
| 2,463,864 A | * | 3/1949 | Gibson ........................... 244/198 |
| 2,553,952 A | | 5/1951 | Turner |
| 2,713,465 A | | 7/1955 | Novinger |
| 3,029,042 A | * | 4/1962 | Martin ............................... 244/2 |
| 3,090,581 A | | 5/1963 | Einarsson |
| 3,126,169 A | * | 3/1964 | Kucher ........................... 244/12.1 |
| 3,317,161 A | * | 5/1967 | Sawyer ............................ 244/36 |
| 3,322,223 A | * | 5/1967 | Bertelsen ......................... 180/120 |
| 3,516,895 A | | 6/1970 | Hartman |
| 3,608,850 A | * | 9/1971 | Fredericks ........................ 244/36 |
| 4,899,954 A | | 2/1990 | Pruszenski, Jr. |

* cited by examiner

*Primary Examiner* — Rob Swiatek
*Assistant Examiner* — Valentina Xavier
(74) *Attorney, Agent, or Firm* — Baker Donelson; Dorian B. Kennedy

(57) ABSTRACT

An air-ground vehicle (10) has a fuselage body (14), a propulsion system (15), and a landing gear system 16. The body includes a passenger compartment (21) and a pair of wings (22). The body also includes a central air channel (25) formed by a U-shaped channel wall (26) and a pivotal horizontal stabilizer (27). Each wing also has a curved top surface (31), a relatively flat bottom surface (32), and an outboard end wall (33). The U-shaped channel wall, top surface, and end walls form a pair of side air channels (36). Each wing has a set of internal S-shaped louvers (41) positioned within an interior airflow channel (48) and directly adjacent an air opening (40) of the interior airflow channel. Each S-shaped louver has a U-shaped trough (42) extending to or into an inverted U-shaped crest (43). Each adjacent pair of S-shaped louvers are spaced from each other to form an airflow gap (46) therebetween.

19 Claims, 2 Drawing Sheets

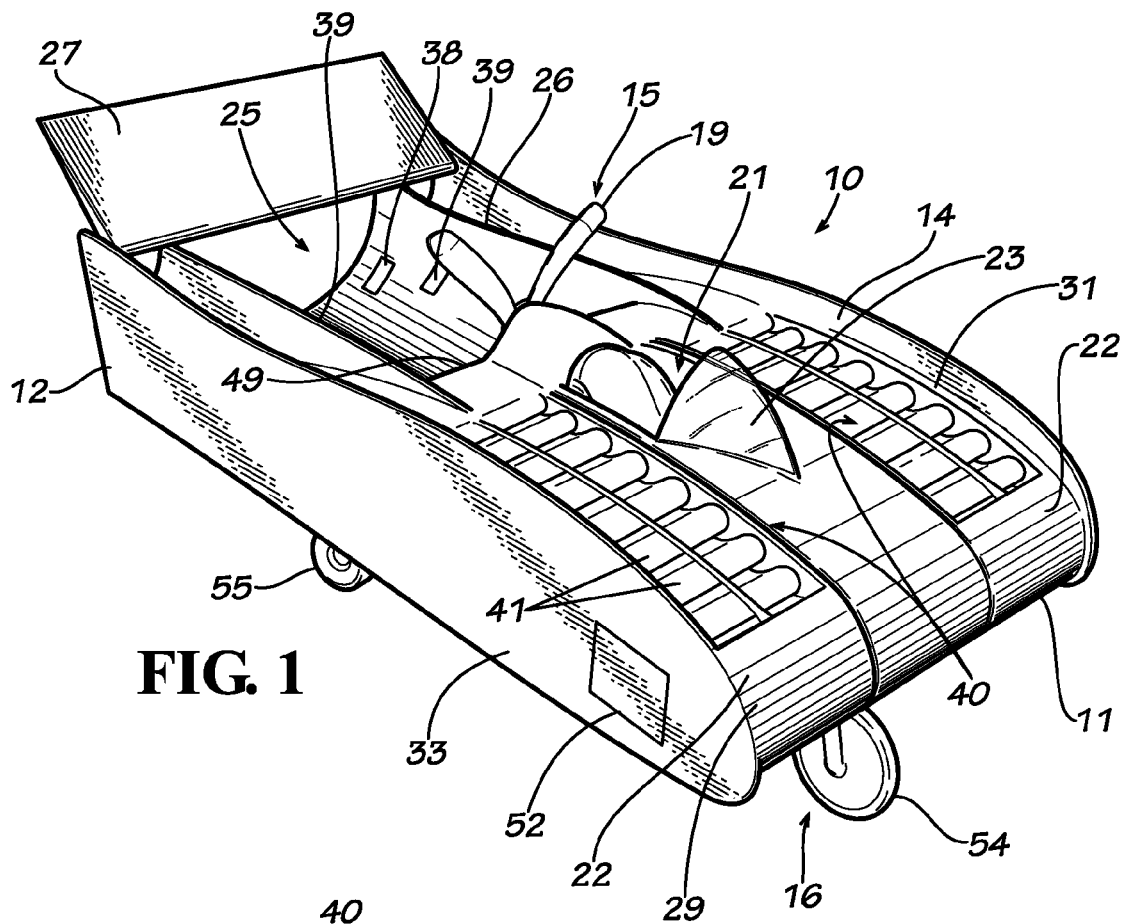
FIG. 1
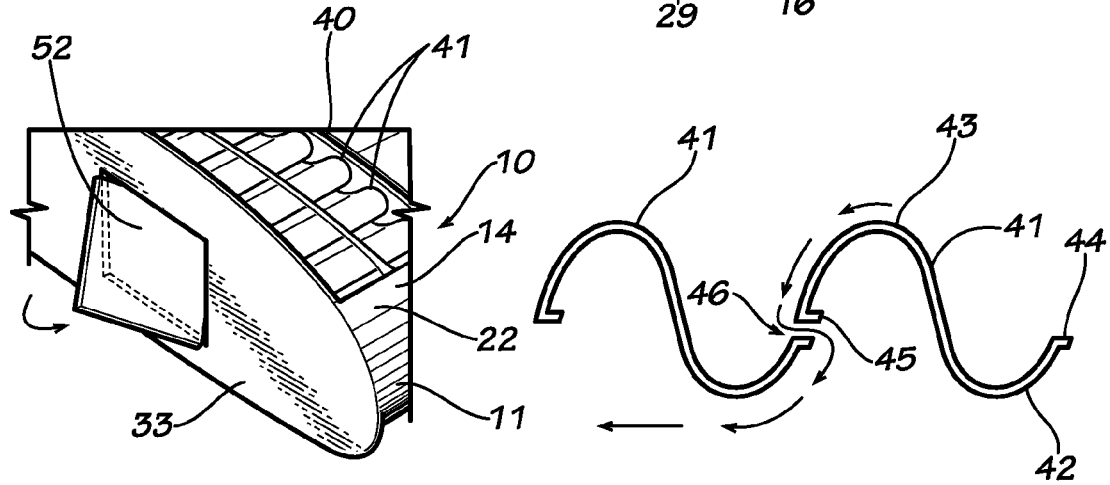
FIG. 4     FIG. 5

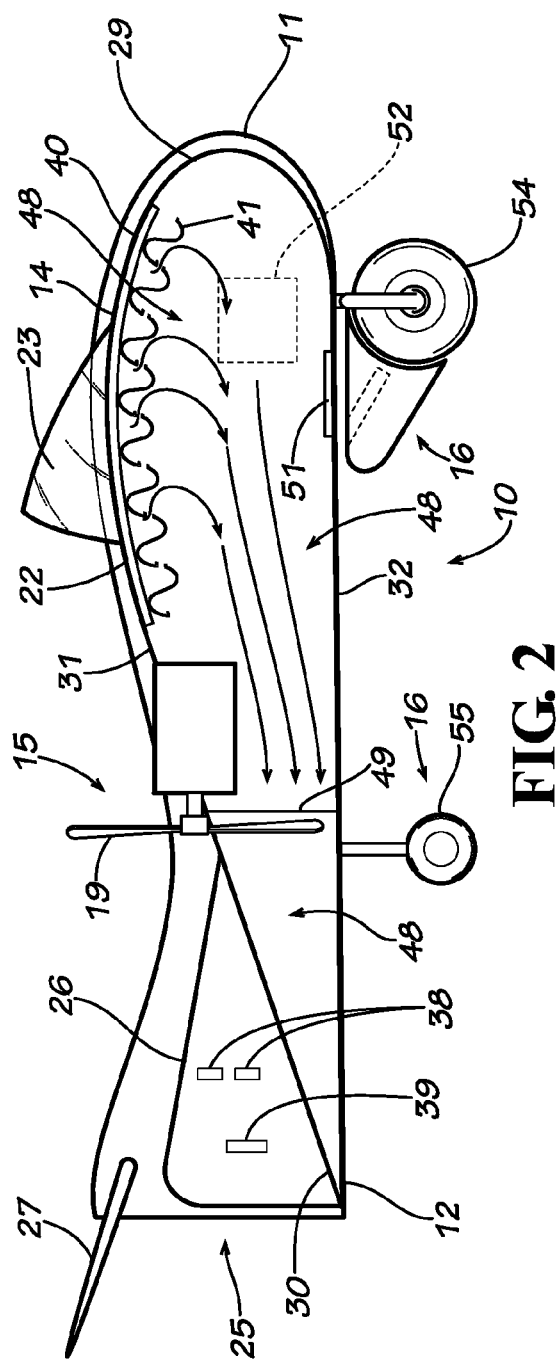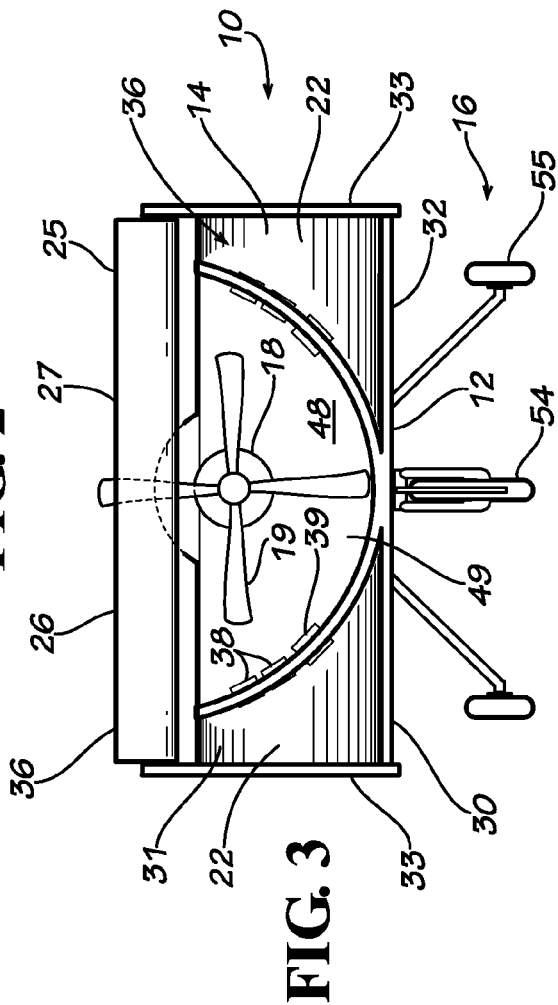

AIR-GROUND VEHICLE

TECHNICAL FIELD

This invention relates generally to vehicles and particularly to vehicles which are capable to operating as a ground vehicle and as an air vehicle.

BACKGROUND OF THE INVENTION

Ground vehicles, such as automobiles, have existed for many decades. These vehicles enable a person to travel over the ground from one location to another. However, due to fixed road layouts, speed limits, traffic congestion, and other traffic related restriction, ground travel is not always the fastest or most efficient manner of travel.

Air vehicles, such as airplanes, have also existed for many decades. These vehicles enable a person to travel through the air, thereby bypassing the restrictions associated with ground transportation. Air travel however also has problems associated with it, such as the limited number of airports and the need to resort to ground transportation once a person arrives at the airport in order to reach his or her final destination.

Accordingly, it is seen that a need remains for a vehicle which can combine the efficiencies of air travel with the convenience of ground travel. It is to the provision of such therefore that the present invention is primarily directed.

SUMMARY OF THE INVENTION

In a preferred form of the invention an air-ground vehicle comprises a body having a forward end and an aft end, an airflow generating device, and a pair of wings. Each wing has a top surface, a bottom surface, and an air channel extending through the wing from an air opening within the top surface to an air exit positioned aftwardly of the air opening. Each wing also has a longitudinal array of S-shaped louvers positioned within the air channel directly adjacent the air opening. The S-shaped louvers form air passage gaps between adjacent pairs of S-shaped louvers. With this construction, air may pass over the wing top surface and into the air opening, and pass over a forwardly positioned S-shaped louver and into the gap between the forwardly positioned S-shaped louver and the next adjacent S-shaped louver before continuing through the air channel and being expelled through the exit end.

BRIEF DESCRIPTION OF THE DRAWING

FIG. 1 is a perspective view of an air-ground vehicle that embodies principles of the invention in its preferred form.

FIG. 2 is a side view of the air-ground vehicle of FIG. 1, shown with portions removed for clarity.

FIG. 3 is a rear view of the air-ground vehicle of FIG. 1.

FIG. 4 is a perspective view of a portion of the air-ground vehicle of FIG. 1.

FIG. 5 is a side view of two S-shaped louvers of the air-ground vehicle of FIG. 1.

DETAILED DESCRIPTION

With reference next to the drawings, there is shown an air-ground vehicle 10 in a preferred form of the invention. The vehicle 10 has a forward end 11 and an aftward or rearward end 12. The vehicle 10 includes an aerodynamic fuselage body 14, a propulsion system 15 coupled to the body 14, and a landing gear or suspension system 16 coupled to the body.

The propulsion system 15 includes an engine or motor 18, a propeller 19 coupled to the motor 18 which is oriented to move air rearwardly, and an unshown fuel tank supplying fuel to the motor 18. The motor 18 is mounted to an internal frame of the body 14. Of course, the motor includes manual controls to control the motor speed and other conventionally known devices or controls associated with airplane type motors.

The body 14 includes a passenger compartment 21 straddled by a pair of air foils, wings, or wing sections 22. The passenger compartment 21 includes a seat, steering and braking controls, instruments, and a pivotal canopy 23 for enclosing the passenger compartment yet allowing access thereto. The body 14, or combination of the body 14 and wings 22, also includes a central air channel 25 formed by a U-shaped channel wall 26 which extends from a position approximately midship and directly behind and adjacent the propeller 19 to a position proximate the rear or aft end 12 of the body. A pivotal horizontal stabilizer and/or elevator 27 is coupled to the top, aft end of the U-shaped channel wall 26.

Each wing 22 has a front or leading edge 29 and a rear or trailing edge 30. Each wing 22 also has a camber or curved top surface 31, a relatively flat bottom surface 32, and an outboard end wall 33. The end walls 33 extend above the top surface 31 so as to form a vertical stabilizer. The end walls 33 extend along the entire top surface 31 of the wing but are most pronounced from approximately mid-ship to approximately the aft end 12 of the body. The combination of the U-shaped channel wall 26, top surface 31, and end walls 33 forms a pair of side air channels 36 positioned on either side of the central air channel 25. The U-shaped channel wall 26 has a pair of fixed air scoops 38 on each side which have passageways extending through the U-shaped channel wall 26 to direct a portion of the air from within the central air channel 25 to the side air channels 36 so as to flow over the top surface 31 in the area of the side air channels 36. Similarly, adjustable air scoops 39 are positioned on each side of the U-shaped channel wall 26 having a passageway through the U-shaped channel wall which allows an adjustable airflow from the central air channel 25 to the side air channels 36 so as to flow over the top surface 31 of the side air channels 36. The additional air flowing over the side channels 36 aids in preventing backflow over the top surface 31 of the wings during low speed maneuvering in order to restrict the stalling of the wings during flight.

Each wing 22 also has two rows, or longitudinal arrays in the direction of the wing cord, of internal S-shaped louvers (louver system) 41 positioned within an air opening 40 extending through the top surface 31 of the wing. In the preferred embodiment, the rows of louvers 41 of each wing have been formed in two rows for structural stability, but may also be formed as a single row or any number of rows depending upon the size and air flow requirements needed for the particular vehicle. Each S-shaped louver 41 has a U-shaped trough 42 extending to or into an inverted U-shaped crest 43. The U-shaped trough 42 commences with a forward, forwardly facing starting flange 44, while the U-shaped crest 43 terminates with an aftward, but forwardly facing ending flange 45. The starting flange 44 and ending flange 45 are positioned one above the other and spaced from each other to form an airflow gap 46 therebetween directly adjacent S-shaped louvers 41.

The interior space of the wing below the rows of louvers is open, with the exception of structural struts and mechanical linkages, so as to form an interior air flow channel 48 which has an exit end 49 positioned closely adjacent to and forward of the propeller 19 and generally aligned within the central air channel 25, i.e., an interior airflow channel 48 extends between air opening 40 and air exit end 49. The S-shaped louvers 41 are positioned within the interior airflow channel 48 in close proximity to the air opening 40 so that a topmost portion of the S-shaped louvers are generally in alignment with the top surface or upper camber 31 of the wing.

Each wing 22 also has an air by-pass door 51 on the wing bottom surface 32 which is pivotal between an open position and a sealed, closed position, as best shown in FIG. 2. Each wing end wall 33 also has a generally square roll control door 52 which pivots between an open position and a sealed, closed position, as best shown in FIG. 4. The roll control door 52 pivots at an angle from the upper, rear corner to the forward, lower corner so that the door is set at a forward and downward angle, with respect to the forward movement of the vehicle, when it is in an open position.

The suspension system 16 includes a steerable nose wheel 54 coupled to a conventional steering mechanism within the passenger compartment 21 through conventional linkage. The suspension system 16 also includes a pair of rear landing gear wheels 55 having a conventional braking system with linkage extending to the passenger compartment. The suspension system 16 may be fixed or designed to be retracted within the fuselage body 14. The steering mechanism may be in the form of a rotating wheel similar to an automobile's steering mechanism, in the form of a pivotal stick similar to an small aircraft's steering mechanism, or a combination of similar steering mechanisms. The steering system may also control the actuation of the horizontal stabilizer or elevator 27 and the actuation of the roll control doors 55, which may be accomplished through conventional small aircraft type linkage.

In use, the vehicle 10 may be driven similarly to an automobile over the ground by steering the vehicle through the use of the pivotal nose wheel 54, controlling the velocity through the operation speed of the motor 18, and braking through the use of the brakes on the suspension system 16. During ground travel the air-bypass doors 51 are opened through manually operated linkage. The opening of the air by-pass doors allows air to flow from beneath the wings into the interior of the wings thereby preventing the wings from creating lift and maintaining the vehicle firmly upon the ground.

The vehicle may also be flown through the air in a manner similarly to that of an airplane. The operation of the motor 18 and thereby the rotation of the propeller 19 creates an airstream flowing in a direction from the forward end 11 to the rearward end 12. The rotation of the propeller 19 also creates a low pressure zone or area within the interior airflow channel 48 (interior of the wings) as air is evacuated from the interior through the interior air flow channel exit end 49.

As shown in FIG. 5, the low pressure zone within the interior airflow channel 48 (the interior of the wing) causes air to flow rearwardly over the crest 43 of the S-shaped louvers 41. As this airstream reaches the bottom of the crest 43 the air is pulled into the gap 46 between the ending flange 45 of the forward S-shaped louver and the starting flange 44 of the adjacent, following S-shaped louver. As the airstream exits the gap 46 it flows rearwardly towards the air flow channel exit end 49.

As the vehicle moves in a forward direction the airflow over the wings 22 increases, further enhancing the airflow not only over the wing but also through the array of S-shaped louvers 41. With enough forward speed and the proper angle of attack of the wing, this movement of air over and through the wings creates a low pressure zone over the wing which is sufficient to create enough lift of get the vehicle airborne. The displacement of the air through the S-shaped louvers further increases the low pressure zone over the wings when compared to wings without such S-shaped louvers. It should be understood that the propeller 19 is creating a strong airflow through the central air channel 25 while air is also flowing over the wings and through the side air channels 36.

Once in flight, the angle of attack of the vehicle and thereby its wings may be controlled through the actuation of the horizontal stabilizer 27, as in most fixed wing aircrafts. The turning and banking of the vehicle however is controlled through the actuation of the roll control doors 52. For example, in order to bank to the left or portward, the operator moves the control so as to open the left or port wing roll control door 52. The opening of the roll control door forces air to rush into the interior of the port wing (interior airflow channel 48) thereby increasing the air pressure therein. This increase of interior air pressure decreases the lift created by the port wing causing it to dip relative to the right or starboard wing and thereby bank the vehicle to the left. The opening of the door and the angling by which it is oriented when opened also causes the roll control door 52 to deflect air in an upward direction, resulting in a downward force on the port side of an aircraft which further enhances the rolling of the vehicle to the left. Of course, the vehicle may be rolled towards the right through operation of the opposite or starboard roll control door.

It should be understood that the airflow generating device shown in the preferred embodiment of a motor and propeller may alternatively be designed as a ducted fan or jet. Such a ducted fan could also be designed to allow controlled orientation of the created airstream, for instance, to direct the airstream in a more downwardly direction in order to provide additional lift for short distance take offs and landings.

It should be understood that while the S-shaped louvers are shown as a group in individual components, the combination of louvers or louver system may be considered one elongated serpentine structure, i.e., the louvers may be formed as individual elements or as a unitary structure with slots or gaps formed between adjacent louvers.

It thus is seen that an improved air-ground vehicle is now provided. While this invention has been described in detail with particular references to the preferred embodiments thereof, it should be understood that many modifications, additions and deletions, in addition to those expressly recited, may be made thereto without departure from the spirit and scope of the invention as set forth in the following claims.

The invention claimed is:

1. An air-ground vehicle comprising,
   a body having a forward end and an aft end;
   an airflow generating device, and
   a pair of wings, each said wing having a top surface, a bottom surface, and an air channel extending through said wing from an air opening within said top surface to an air exit positioned aftwardly of said air opening, each said wing also having a longitudinal array of S-shaped louvers positioned within said air channel directly adjacent said air opening, said S-shaped louvers forming air passage gaps between adjacent pairs of said S-shaped louvers,
   whereby air may pass over the wing top surface and into the air opening, and pass over a forwardly positioned S-shaped louver and into the gap between the forwardly positioned S-shaped louver and the next adjacent S-shaped louver before continuing through the air channel and being expelled through the exit end.

2. The air-ground vehicle of claim 1 wherein said airflow generating device is a motor and a propeller coupled to said motor.

3. The air-ground vehicle of claim 2 wherein said air exit is positioned closely adjacent said propeller.

4. The air-ground vehicle of claim 2 further comprising an air channel wall extending from a position closely adjacent said propeller to a position adjacent an aft end of said body.

5. The air-ground vehicle of claim 4 wherein said air channel wall is a U-shaped air channel wall.

6. The air-ground vehicle of claim 1 wherein each said wing also includes an end wall having a roll control door which is pivotal between a closed position and an open position allowing ambient air into said air channel of said wing.

7. The air-ground vehicle of claim 1 wherein each said wing bottom surface has an air by-pass door which is pivotal between a closed position and an open position allowing ambient air into said air channel of said wing.

8. The air-ground vehicle of claim 7 wherein each said wing also includes an end wall, said end wall having a roll control door which is pivotal between a closed position and an open position allowing ambient air into said air channel of said wing.

9. The air-ground vehicle of claim 1 further comprising a suspension system having a plurality of wheels.

10. The air-ground vehicle of claim 1 further comprising a horizontal stabilizer.

11. An air-ground vehicle comprising,
a body having a forward end and an aft end;
a suspension system coupled to said body;
an airflow generating device, and
a pair of wings, each said wing having a top surface, a bottom surface, and an air channel extending through said wing from an air opening within said top surface to an air exit proximal said aft end, each said wing also having a series of louvers positioned within said air channel and in close proximity to said air opening, said louvers forming air passage gaps between adjacent pairs of said louvers, wherein each said louver has a U-shaped crest functionally extending to an inverted U-shaped trough,
whereby air may pass over the wing top surface and into the air opening, and pass over a forwardly positioned louver and into the gap between the forwardly positioned louver and the next adjacent louver before continuing through the air channel and being expelled through the exit end.

12. The air-ground vehicle of claim 11 wherein said airflow generating device is a motor and a propeller coupled to said motor.

13. The air-ground vehicle of claim 12 wherein said air exit is positioned closely adjacent said propeller.

14. The air-ground vehicle of claim 12 further comprising an air channel wall extending from a position closely adjacent said propeller to a position adjacent an aft end of said body.

15. The air-ground vehicle of claim 11 wherein the tops of said louver U-shaped crests are aligned along said top surface of said wing.

16. An air-ground vehicle comprising,
a body having a forward end and an aft end;
a suspension system coupled to said body;
an airflow generating device, and
a pair of wings, each said wing having a top surface, a bottom surface, and an air channel extending through said wing from an air opening within said top surface to an air exit proximal said aft end, each said wing also having a series of S-shaped louvers positioned within said air channel and in close proximity to said air opening, said louvers forming air passage gaps between adjacent pairs of said louvers, wherein each said wing also includes an end wall having a roll control door which is pivotal between a closed position and an open position allowing ambient air into said air channel of said wing,
whereby air may pass over the wing top surface and into the air opening, and pass over a forwardly positioned louver and into the gap between the forwardly positioned louver and the next adjacent louver before continuing through the air channel and being expelled through the exit end.

17. An air-ground vehicle comprising,
a body having a forward end and an aft end;
a suspension system coupled to said body;
a combination motor and propeller coupled to said motor, and
a pair of wings, each said wing having a top surface, a bottom surface, and an air channel extending from an air opening within said top surface to an air exit, each said wing also having an S-shaped louver system positioned within said air channel, said louver system having a plurality of crests and a plurality of troughs with each trough being positioned between pairs of adjacent crests, said louver system also having an air gap positioned generally along the aftward transition between each said crest and said trough,
whereby air may pass over the wing top surface and into the air opening, and pass over a forwardly positioned crest and into the gap between the forwardly positioned crest and the next adjacent trough before continuing through the air channel and being expelled through the exit end.

18. The air-ground vehicle of claim 17 wherein the tops of said louver system crests are aligned along said top surface of said wing.

19. The air-ground vehicle of claim 17 wherein each said wing also includes an end wall having a roll control door which is pivotal between a closed position and an open position allowing ambient air into said air channel of said wing.

* * * * *